United States Patent
Xue et al.

(10) Patent No.: US 12,363,635 B2
(45) Date of Patent: Jul. 15, 2025

(54) TERMINAL USING NETWORK POWER SAVING SIGNAL TO DETERMINE STATUS ON MULTIPLE FREQUENCY RESOURCE UNITS

(71) Applicant: HUAWEI TECHNOLOGIES CO., LTD., Guangdong (CN)

(72) Inventors: Yifan Xue, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/422,614

(22) PCT Filed: Mar. 30, 2020

(86) PCT No.: PCT/CN2020/081976
§ 371 (c)(1),
(2) Date: Jul. 13, 2021

(87) PCT Pub. No.: WO2020/192780
PCT Pub. Date: Oct. 1, 2020

(65) Prior Publication Data
US 2022/0095220 A1    Mar. 24, 2022

(30) Foreign Application Priority Data
Mar. 28, 2019 (CN) .......................... 201910245841.1

(51) Int. Cl.
*H04W 52/02* (2009.01)
*H04W 76/28* (2018.01)
(52) U.S. Cl.
CPC ................. *H04W 52/0212* (2013.01); *H04W 52/0235* (2013.01); *H04W 76/28* (2018.02)

(58) Field of Classification Search
CPC ......... H04W 52/0212; H04W 52/0216; H04W 52/0225; H04W 52/0235
See application file for complete search history.

(56) References Cited

U.S. PATENT DOCUMENTS

| | | | |
|---|---|---|---|
| 2010/0061284 A1* | 3/2010 | Chen ..................... | H04W 52/10 370/311 |
| 2011/0116467 A1* | 5/2011 | Jung ................. | H04W 72/0453 370/329 |

(Continued)

FOREIGN PATENT DOCUMENTS

| | | |
|---|---|---|
| CN | 102113290 A | 6/2011 |
| CN | 108886750 A | 11/2018 |

(Continued)

OTHER PUBLICATIONS

Extended European Search Report issued in European Application No. 20776555.3 on Dec. 12, 2021, 11 pages.

(Continued)

*Primary Examiner* — Wen W Huang
(74) *Attorney, Agent, or Firm* — Fish & Richardson P.C.

(57) ABSTRACT

The application discloses example methods and apparatuses. One example method includes receiving, by a terminal, a power saving signal sent by a network device, wherein the power saving signal is used to indicate statuses of the terminal on N frequency resource units, and N is an integer greater than 1. The terminal then determines the statuses of the terminal on the N frequency resource units based on the power saving signal. By applying the technical solutions, the statuses of the terminal on the plurality of frequency resource units are indicated by using one power saving signal, without the need to correspondingly indicate the statuses of the terminal on the plurality of frequency (Continued)

resource units by using a plurality of power saving signals. This can reduce signaling overheads.

20 Claims, 3 Drawing Sheets

(56) References Cited

U.S. PATENT DOCUMENTS

| | | | |
|---|---|---|---|
| 2011/0128901 A1 | 6/2011 | Lee et al. | |
| 2013/0301589 A1* | 11/2013 | Li | H04W 24/10 |
| | | | 370/329 |
| 2014/0056279 A1* | 2/2014 | Chen | H04L 45/245 |
| | | | 370/329 |
| 2016/0043843 A1 | 2/2016 | Liu et al. | |
| 2016/0119930 A1* | 4/2016 | Yan | H04L 1/0061 |
| | | | 370/329 |
| 2017/0346614 A1* | 11/2017 | Tan Bergström | H04L 43/16 |
| 2018/0338313 A1* | 11/2018 | He | H04B 7/0686 |
| 2019/0297577 A1* | 9/2019 | Lin | H04W 52/0219 |
| 2019/0306832 A1* | 10/2019 | Si | H04W 56/0015 |
| 2020/0092814 A1 | 3/2020 | Zhou et al. | |
| 2020/0313833 A1 | 10/2020 | Yi et al. | |
| 2021/0076361 A1* | 3/2021 | Takeda | H04L 5/0094 |
| 2021/0392505 A1* | 12/2021 | Harada | H04W 74/0808 |
| 2022/0095291 A1* | 3/2022 | Ohara | H04W 72/23 |

FOREIGN PATENT DOCUMENTS

| | | |
|---|---|---|
| CN | 109041229 A | 12/2018 |
| CN | 109246826 A | 1/2019 |
| CN | 109496452 A | 3/2019 |
| CN | 110913460 A | 3/2020 |
| JP | 2012529841 A | 11/2012 |
| KR | 20150079736 A | 7/2015 |
| WO | 2010143924 A2 | 12/2010 |
| WO | 2018142264 A1 | 8/2018 |

OTHER PUBLICATIONS

Qualcomm Incorporated, "UE Adaptation to the Traffic and UE Power Consumption Characteristics," 3GPP TSG-RAN WG1 Ad-Hoc Meeting 1901, R1-1900911, Taipei, Taiwan, Jan. 21-25, 2019, 24 pages.

ZTE, "Discussion on potential techniques for UE power saving," 3GPP TSG RAN WG1 Meeting #96, R1-1902031, Athens, Greece, Feb. 25-Mar. 1, 2019, 21 pages.

3GPP TS 38.213 V15.4.0 (Dec. 2018), "3rd Generation Partnership Project; Technical Specification Group Radio Access Network; NR;Physical layer procedures for control(Release 15)," Dec. 2018, 104 pages.

3GPP TS 38.321 V15.4.0 (Dec. 2018), "3rd Generation Partnership Project; Technical Specification Group Radio Access Network;NR;Medium Access Control (MAC) protocol specification(Release 15)," Dec. 2018, 77 pages.

3GPP TS 38.331 V15.4.0 (Dec. 2018), "3rd Generation Partnership Project; Technical Specification Group Radio Access Network; NR;Radio Resource Control (RRC) protocol specification (Release 15)," Dec. 2018, 474 pages.

CATT, "Presentation of Specification/Report to TSG: TR 38.840v1. 0.0," 3GPP TSG-RAN Meeting #83, RP-190574, Shenzhen, China, Mar. 18-21, 2019, 70 pages.

Ericsson, Reduced latency Scell management for NR CA, 3GPP TSG-RAN WG1 #98bis, R1-1911015, Chongqing, China, Oct. 14-20, 2019, 9 pages.

Huawei et al., "Discussion on the WI scope on NR UE power saving," 3GPP TSG RAN Meeting #83, RP-190348, Shenzhen, China, Mar. 18-21, 2019, 3 pages.

Huawei et al., "Power saving schemes," 3GPP TSG RAN WG1 Meeting #96, R1-1901572, Athens, Greece, Feb. 25-Mar. 1, 2019, 20 pages.

LG Electronics, "Discussion on potential techniques for UE power saving," 3GPP TSG RAN WG1 #96, R1-1902053, Athens, Greece, Feb. 25-Mar. 1, 2019, 6 pages.

MediaTek Inc., "NR UE Power Saving Designs," 3GPP TSG RAN WG1 Meeting #96, R1-1901804, Athens, Greece, Feb. 25-Mar. 1, 2019, 28 pages.

Oppo, "UE Adaptation to the Traffic and UE Power Consumption," 3GPP TSG RAN WG1 #96, R1-1902745, Athens, Greece, Feb. 25-Mar. 1, 2019, 14 pages.

Office Action issued in Chinese Application No. 201910245841.1 on Oct. 11, 2021, 6 pages.

PCT International Search Report and Written Opinion issued in International Application No. PCT/CN2020/081976 on Jun. 19, 2020, 16 pages (with English translation).

Qualcomm Incorporated, "Potential Techniques for UE Power Saving," 3GPP TSG-RAN WG1 #96, R1-1903016, Athens, Greece, Feb. 25-Mar. 1, 2019, 33 pages.

CATT, "UE Power Saving Schemes and Power Saving Signal/Channel," 3GPP TSG RAN WG1 #96, R1-1902025, Athens, Greece, Feb. 25-Mar. 1, 2019, 26 pages.

Huawei, HiSilicon, "Discussion on UE Power Saving in CA Scenario," 3GPP TSG RAN WG2 #105, R2-1901289, Athens, Greece, Feb. 25-Mar. 1, 2019, 3 pages.

MediaTek Inc., "NR UE Power Saving Designs," 3GPP TSG RAN WG1 #96, R1-1901804, Athens, Greece, Feb. 25-Mar. 1, 2019, 29 pages.

MediaTek Inc., "Triggering Adaptation for UE Power Saving," 3GPP TSG RAN WG1 #95, R1-1812362, Spokane, USA, Nov. 12-16, 2018, 13 pages.

Office Action issued in Japanese Application No. 2021-544377 on Aug. 2, 2022, 10 pages (with English translation).

Spreadtrum Communications, "Discussion on UE Adaptation to the Traffic and UE Power Consumption Characteristics," 3GPP TSG RAN WG1 Ad-Hoc Meeting 1901, R1-1900719, Taipei, Jan. 21-25, 2019, 8 pages.

Office Action issued in Chinese Application No. 201910245841.1 on Nov. 1, 2022, 4 pages.

Spreadtrum Communications, "Discussion On UE Adaptation To The Traffic And UE Power Consumption Characteristics," 3GPP TSG RAN WG1Ad-Hoc Meeting 1901, R1-1900719, Taipei, Jan. 21-25, 2019, 7 pages.

Office Action in Japanese Appln. No. 2021-544377, dated Nov. 10, 2022, 6 pages (with English translation).

Office Action in Korean Appln. No. 2021-7022704, dated Jan. 25, 2023, 5 pages (with English translation).

\* cited by examiner

TERMINAL USING NETWORK POWER SAVING SIGNAL TO DETERMINE STATUS ON MULTIPLE FREQUENCY RESOURCE UNITS

CROSS-REFERENCE TO RELATED APPLICATIONS

This application is a national stage of International Application No. PCT/CN2020/081976, filed Mar. 30, 2020, which claims priority to Chinese Patent Application No. 201910245841.1, filed on Mar. 28, 2019. Both of the aforementioned applications are hereby incorporated by reference in their entireties.

TECHNICAL FIELD

Embodiments of this application relate to the field of communications technologies, and in particular, to a communication method and apparatus.

BACKGROUND

Standby time of a terminal is an important part that affects user experience. Because a 5th generation ($5^{th}$ generation, 5G) new radio (new radio, NR) system needs to support a wider bandwidth, a higher transmission rate, and a wider coverage area than a long term evolution (long term evolution, LTE) system, power consumption of an NR terminal is higher than power consumption of an LTE terminal.

To ensure good user experience, the 3rd generation partnership project (3rd generation partnership project, 3GPP) initiates a project in Rel-16 for reducing power consumption of a terminal to study an optimization solution about how to reduce the power consumption of the terminal, so as to save energy of the terminal.

SUMMARY

Embodiments of this application provide a communication method and apparatus, to reduce power consumption of a terminal to a maximum extent.

To achieve the objective, the following technical solutions are used in the embodiments of this application.

According to a first aspect, an embodiment of this application provides a communication method. The method includes: A terminal receives a power saving signal that is sent by a network device and that is used to indicate statuses of the terminal on N frequency resource units, and determines the statuses of the terminal on the N frequency resource units based on the received power saving signal, where N is an integer greater than 1. Each of the statuses of the terminal on the N frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling.

According to the method provided in the first aspect, the terminal may receive, from the network device, indication information other than the information about whether to monitor the PDCCH, for example, a plurality of pieces of information such as information about a specific manner in which the terminal monitors the PDCCH (including a search space set monitored when the terminal monitors the PDCCH, a format of the PDCCH monitored by the terminal, or a manner in which the terminal performs short sleep when monitoring the PDCCH), the information that the terminal performs the CSI measurement or does not perform the CSI measurement, the information about the active BWP on which the terminal is located, the information about the quantity of receive antennas of the terminal, the information about the quantity of receiving layers of the terminal, the information about the maximum quantity of receiving layers of the terminal, the information about the quantity of transmit antennas of the terminal, the information about the quantity of transmit layers of the terminal, the information about the maximum quantity of transmit layers of the terminal, and the information that the terminal performs cross-slot scheduling or does not perform cross-slot scheduling. Statuses of the terminal on a plurality of frequency resource units are determined based on an indication of the network device, so that the terminal adjusts a current status of the terminal to the determined status. In this way, a behavior of the terminal may be controlled from a plurality of aspects, so that when no service is carried, the terminal disables some functions of the terminal for the plurality of frequency resource units, to reduce power consumption of the terminal. In addition, the statuses of the terminal on the plurality of frequency resource units are indicated by using one power saving signal, and there is no need to correspondingly indicate the statuses of the terminal on the plurality of frequency resource units by using a plurality of power saving signals. This reduces signaling overheads.

With reference to the first aspect, in a first embodiment of the first aspect, the manner in which the terminal monitors the PDCCH includes at least one of the following: the search space set monitored when the terminal monitors the PDCCH, the format of the PDCCH monitored by the terminal, and the manner in which the terminal performs short sleep when monitoring the PDCCH. Based on this possible design, a search space monitored when the terminal monitors the PDCCH, a specific format of PDCCH that can be monitored, and the manner in which the terminal performs short sleep when monitoring the PDCCH may be controlled. In this way, the terminal pertinently monitors the PDCCH and performs short sleep, and does not need to monitor all PDCCHs in all search space sets. This reduces power consumption caused when the terminal monitors the PDCCH.

With reference to the first aspect or the first embodiment of the first aspect, in a second embodiment of the first aspect, the power saving signal includes M status index values. The M status index values correspondingly indicate the statuses of the terminal on the N frequency resource units. M is a positive integer, and M is less than or equal to N. Based on this possible design, the status index values may be used to indicate the statuses of the terminal on the frequency resource units. This is simple and easy to implement.

With reference to the second embodiment of the first aspect, in a third embodiment of the first aspect, when M is less than N, at least one of the M status index values correspondingly indicates statuses of the terminal on at least two of the N frequency resource units. Based on this possible design, one status index value may be used to indicate the statuses of the terminal on the two or more frequency resource units, to reduce signaling overheads.

With reference to the second embodiment of the first aspect or the third embodiment of the first aspect, in a fourth embodiment of the first aspect, a first correspondence exists between the status index value and the status, and the first correspondence is predefined, or is configured by the network device. Based on this possible design, a correspondence between a status index value and a status may be predefined, or the correspondence between a status index value and a status may be configured by the network device. This is simple and easy to implement.

With reference to the first aspect or the first embodiment of the first aspect, in a fifth embodiment of the first aspect, the power saving signal includes K sub-status index value groups. The K sub-status index value groups correspondingly indicate the statuses of the terminal on the N frequency resource units. K is a positive integer, and K is less than or equal to N. Based on this possible design, a sub-status index value correspondingly indicating the information included in the status of the terminal may be included in the power saving signal and sent to the terminal.

With reference to the fifth embodiment of the first aspect, in a sixth embodiment of the first aspect, when K is less than N, at least one of the K sub-status index value groups correspondingly indicates statuses of the terminal on at least two of the N frequency resource units. Based on this possible design, the status index value group may be used to indicate the statuses of the terminal on the two or more frequency resource units, to reduce the signaling overheads.

With reference to the fifth embodiment of the first aspect or the sixth embodiment of the first aspect, in a seventh embodiment of the first aspect, each sub-status index value group includes at least one sub-status index value, and a second correspondence exists between the sub-status index value and one piece of information included in the status. The second correspondence is predefined, or is configured by the network device. Based on this possible design, a correspondence between a sub-status index value and information included in a status may be predefined, or the correspondence between a sub-status index value and information included in a status may be configured by the network device. This is simple and easy to implement.

With reference to any one of the first aspect or the embodiments of the first aspect, in an eighth embodiment of the first aspect, the frequency resource unit is a carrier or a BWP. Based on this possible design, the power saving signal delivered by the network device may indicate a status of the terminal on the carrier or in the BWP. It should be noted that, in this embodiment of this application, the frequency resource unit may be alternatively described as a frequency domain resource unit or may have another name. This is not limited.

According to a second aspect, this application provides a communications apparatus. The communications apparatus may be a terminal, a chip in a terminal, or a system-on-a-chip, or may be a functional module that is in a terminal and that is configured to implement the method according to any one of the first aspect or the possible designs of the first aspect. The communications apparatus may implement functions performed by the terminal in the foregoing aspect or the possible designs, and the functions may be implemented by hardware executing corresponding software. The hardware or the software includes one or more modules corresponding to the functions. For example, the communications apparatus may include a receiving unit and a determining unit.

The receiving unit is configured to receive a power saving signal that is sent by a network device and that is used to indicate statuses of the terminal on N frequency resource units.

The determining unit is configured to determine the statuses of the terminal on the N frequency resource units based on the received power saving signal, where N is an integer greater than 1. Each of the statuses of the terminal on the N frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling.

With reference to the second aspect, in a first embodiment of the second aspect, the manner in which the terminal monitors the PDCCH includes at least one of the following: a search space set monitored when the terminal monitors the PDCCH, a format of the PDCCH monitored by the terminal, and a manner in which the terminal performs short sleep when monitoring the PDCCH. Based on this possible design, a search space monitored when the terminal monitors the PDCCH, a specific format of PDCCH that can be monitored, and the manner in which the terminal performs short sleep when monitoring the PDCCH may be controlled. In this way, the terminal pertinently monitors the PDCCH and performs short sleep, and does not need to monitor all PDCCHs in all search space sets. This reduces power consumption caused when the terminal monitors the PDCCH.

With reference to the second aspect or the first embodiment of the second aspect, in a second embodiment of the second aspect, the power saving signal includes M status index values. The M status index values correspondingly indicate the statuses of the terminal on the N frequency resource units. M is a positive integer, and M is less than or equal to N. Based on this possible design, the status index values may be used to indicate the statuses of the terminal on the frequency resource units. This is simple and easy to implement.

With reference to the second embodiment of the second aspect, in a third embodiment of the second aspect, when M is less than N, at least one of the M status index values correspondingly indicates statuses of the terminal on at least two of the N frequency resource units. Based on this possible design, one status index value may be used to indicate the statuses of the terminal on the two or more frequency resource units, to reduce signaling overheads.

With reference to the second embodiment of the second aspect or the third embodiment of the second aspect, in a fourth embodiment of the second aspect, a first correspondence exists between the status index value and the status, and the first correspondence is predefined, or is configured by the network device. Based on this possible design, a correspondence between a status index value and a status may be predefined, or the correspondence between a status index value and a status may be configured by the network device. This is simple and easy to implement.

With reference to the second aspect or the first embodiment of the second aspect, in a fifth embodiment of the second aspect, the power saving signal includes K sub-status index value groups. The K sub-status index value groups correspondingly indicate the statuses of the terminal on the N frequency resource units. K is a positive integer, and K is less than or equal to N. Based on this possible design, a sub-status index value correspondingly indicating the information included in the status of the terminal may be included in the power saving signal and sent to the terminal.

With reference to the fifth embodiment of the second aspect, in a sixth embodiment of the second aspect, when K is less than N, at least one of the K sub-status index value groups correspondingly indicates statuses of the terminal on at least two of the N frequency resource units. Based on this possible design, the status index value group may be used to indicate the statuses of the terminal on the two or more frequency resource units, to reduce the signaling overheads.

With reference to the fifth embodiment of the second aspect or the sixth embodiment of the second aspect, in a seventh embodiment of the second aspect, each sub-status index value group includes at least one sub-status index value, and a second correspondence exists between the sub-status index value and one piece of information included in the status. The second correspondence is predefined, or is configured by the network device. Based on this possible design, a correspondence between a sub-status index value and information included in a status may be predefined, or the correspondence between a sub-status index value and information included in a status may be configured by the network device. This is simple and easy to implement.

With reference to any one of the second aspect or the embodiments of the second aspect, in an eighth embodiment of the second aspect, the frequency resource unit is a carrier or a BWP. Based on this possible design, the power saving signal delivered by the network device may indicate a status of the terminal on the carrier or in the BWP. It should be noted that, in this embodiment of this application, the frequency resource unit may be alternatively described as a frequency domain resource unit or may have another name. This is not limited.

According to a third aspect, a communications apparatus is provided. The communications apparatus may be a terminal, a chip in a terminal, or a system-on-a-chip. The communications apparatus may implement functions performed by the terminal in the foregoing aspects or the possible designs. The functions may be implemented by hardware. For example, in a possible design, the communications apparatus may include a processor and a communications interface. The processor may be configured to support the communications apparatus in implementing the function in any one of the first aspect or the possible designs of the first aspect. For example, the processor may receive, through the communications interface, a power saving signal that is sent by a network device and that is used to indicate statuses of the terminal on N frequency resource units, and determine the statuses of the terminal on the N frequency resource units based on the received power saving signal, where N is an integer greater than 1. The status may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling. In still another possible design, the communications apparatus may further include a memory. The memory is configured to store a computer-executable instruction and data that are necessary for the communications apparatus. When the communications apparatus runs, the processor executes the computer-executable instruction stored in the memory, so that the communications apparatus performs the communication method according to any one of the first aspect or the possible designs of the first aspect.

According to a fourth aspect, a computer-readable storage medium is provided. The computer-readable storage medium may be a readable non-volatile storage medium, and the computer-readable storage medium stores an instruction. When the instruction is run on a computer, the computer is enabled to perform the communication method according to any one of the first aspect or the possible designs of the foregoing aspect.

According to a fifth aspect, a computer program product including an instruction is provided. When the computer program product runs on a computer, the computer is enabled to perform the communication method according to the first aspect or the possible designs of the foregoing aspect.

According to a sixth aspect, a communications apparatus is provided. The communications apparatus may be a terminal, a chip in a terminal, or a system-on-a-chip. The communications apparatus includes one or more processors and one or more memories. The one or more memories are coupled to the one or more processors, and the one or more memories are configured to store computer program code. The computer program code includes a computer instruction, and when the one or more processors execute the computer instruction, the communications apparatus is enabled to perform the communication method according to any one of the first aspect or the possible designs of the first aspect.

For a technical effect achieved in any design mode of the third aspect to the sixth aspect, refer to the technical effect achieved in any one of the first aspect or the possible designs of the first aspect. Details are not described again.

According to a seventh aspect, an embodiment of this application provides a communication method. The method includes: A network device generates a power saving signal used to indicate statuses of a terminal on N frequency resource units, and sends the power saving signal to the terminal, where N is an integer greater than 1. Each of the statuses of the terminal on the frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling.

Based on the method provided in the seventh aspect, the network device may send, to the terminal, indication information other than the information about whether to monitor the PDCCH. For example, a plurality of pieces of information, such as a specific manner in which the terminal monitors the PDCCH (including a search space set monitored when the terminal monitors the PDCCH, a format of the PDCCH monitored by the terminal, or a manner in which the terminal performs short sleep when monitoring the PDCCH), the information that the terminal performs the CSI measurement or does not perform the CSI measurement, the information about the active BWP on which the terminal is located, the information about the quantity of receive antennas of the terminal, the information about the quantity of receiving layers of the terminal, the information about the maximum quantity of receiving layers of the terminal, the information about the quantity of transmit antennas of the terminal, the information about the quantity of transmit layers of the terminal, the information about the maximum quantity of transmit layers of the terminal, and the information that the terminal performs cross-slot scheduling or does not perform cross-slot scheduling, may be sent to the terminal, so that the terminal determines statuses of the terminal on a plurality of frequency resource units based on an indication of the network device, and adjusts a status of the terminal to the determined status. In this way, a behavior of the terminal may be controlled from a plurality of aspects, so that when no service is carried, the terminal disables some functions of the terminal for the plurality of frequency resource units, to reduce power consumption of the terminal. In addition, the statuses of the terminal on the plurality of frequency resource units are indicated by using one power saving signal, and there is no need to correspondingly indicate the statuses of the terminal on the plurality of frequency resource units by using a plurality of power saving signals. This reduces signaling overheads.

With reference to the seventh aspect, in a first embodiment of the seventh aspect, the manner in which the terminal monitors the PDCCH includes at least one of the following: the search space set monitored when the terminal monitors the PDCCH, the format of the PDCCH monitored by the terminal, and the manner in which the terminal performs short sleep when monitoring the PDCCH. Based on this possible design, a search space monitored when the terminal monitors the PDCCH, a specific format of PDCCH that can be monitored, and the manner in which the terminal performs short sleep when monitoring the PDCCH may be controlled. In this way, the terminal pertinently monitors the PDCCH and performs short sleep, and does not need to monitor all PDCCHs in all search space sets. This reduces power consumption caused when the terminal monitors the PDCCH.

With reference to the seventh aspect or the first embodiment of the seventh aspect, in a second embodiment of the seventh aspect, the power saving signal includes M status index values. The M status index values correspondingly indicate the statuses of the terminal on the N frequency resource units. M is a positive integer, and M is less than or equal to N. Based on this possible design, the status index values may be used to indicate the statuses of the terminal on the frequency resource units. This is simple and easy to implement.

With reference to the second embodiment of the seventh aspect, in a third embodiment of the seventh aspect, when M is less than N, at least one of the M status index values correspondingly indicates statuses of the terminal on at least two of the N frequency resource units. Based on this possible design, one status index value may be used to indicate the statuses of the terminal on the two or more frequency resource units, to reduce signaling overheads.

With reference to the second embodiment of the seventh aspect or the third embodiment of the seventh aspect, in a fourth embodiment of the seventh aspect, a first correspondence exists between the status index value and the status, and the first correspondence is predefined, or is configured by the network device. Based on this possible design, a correspondence between a status index value and a status may be predefined, or the correspondence between a status index value and a status may be configured by the network device. This is simple and easy to implement.

With reference to the seventh aspect or the first embodiment of the seventh aspect, in a fifth embodiment of the seventh aspect, the power saving signal includes K sub-status index value groups. The K sub-status index value groups correspondingly indicate the statuses of the terminal on the N frequency resource units. K is a positive integer, and K is less than or equal to N. Based on this possible design, a sub-status index value correspondingly indicating the information included in the status of the terminal may be included in the power saving signal and sent to the terminal.

With reference to the fifth embodiment of the seventh aspect, in a sixth embodiment of the seventh aspect, when K is less than N, at least one of the K sub-status index value groups correspondingly indicates statuses of the terminal on at least two of the N frequency resource units. Based on this possible design, the status index value group may be used to indicate the statuses of the terminal on the two or more frequency resource units, to reduce the signaling overheads.

With reference to the fifth embodiment of the seventh aspect or the sixth embodiment of the seventh aspect, in a seventh embodiment of the seventh aspect, each sub-status index value group includes at least one sub-status index value, and a second correspondence exists between the sub-status index value and one piece of information included in the status. The second correspondence is predefined, or is configured by the network device. Based on this possible design, a correspondence between a sub-status index value and information included in a status may be predefined, or the correspondence between a sub-status index value and information included in a status may be configured by the network device. This is simple and easy to implement.

With reference to any one of the seventh aspect or the embodiments of the seventh aspect, in an eighth embodiment of the seventh aspect, the frequency resource unit is a carrier or a BWP. Based on this possible design, the power saving signal delivered by the network device may indicate a status of the terminal on the carrier or in the BWP. It should be noted that, in this embodiment of this application, the frequency resource unit may be alternatively described as a frequency domain resource unit or may have another name. This is not limited.

According to an eighth aspect, this application provides a communications apparatus. The communications apparatus may be a network device, a chip in a network device, or a system-on-a-chip, or may be a functional module that is in a network device and that is configured to implement the method according to any one of the seventh aspect or the possible designs of the seventh aspect. The communications apparatus may implement functions performed by the network device in the foregoing aspect or the possible designs, and the functions may be implemented by hardware executing corresponding software. The hardware or the software includes one or more modules corresponding to the functions. For example, the communications apparatus may include a generation unit and a sending unit.

The generation unit is configured to generate a power saving signal used to indicate statuses of a terminal on N frequency resource units, where N is an integer greater than 1.

The sending unit is configured to send the power saving signal to the terminal. Each of the statuses of the terminal on the frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling.

With reference to the eighth aspect, in a first embodiment of the eighth aspect, the manner in which the terminal monitors the PDCCH includes at least one of the following: a search space set monitored when the terminal monitors the PDCCH, a format of the PDCCH monitored by the terminal, and a manner in which the terminal performs short sleep when monitoring the PDCCH. Based on this possible design, a search space monitored when the terminal monitors the PDCCH, a specific format of PDCCH that can be monitored, and the manner in which the terminal performs short sleep when monitoring the PDCCH may be controlled. In this way, the terminal pertinently monitors the PDCCH and performs short sleep, and does not need to monitor all PDCCHs in all search space sets. This reduces power consumption caused when the terminal monitors the PDCCH.

With reference to the eighth aspect or the first embodiment of the eighth aspect, in a second embodiment of the eighth aspect, the power saving signal includes M status index values. The M status index values correspondingly indicate the statuses of the terminal on the N frequency resource units. M is a positive integer, and M is less than or equal to N. Based on this possible design, the status index values may be used to indicate the statuses of the terminal on the frequency resource units. This is simple and easy to implement.

With reference to the second embodiment of the eighth aspect, in a third embodiment of the eighth aspect, when M is less than N, at least one of the M status index values correspondingly indicates statuses of the terminal on at least two of the N frequency resource units. Based on this possible design, one status index value may be used to indicate the statuses of the terminal on the two or more frequency resource units, to reduce signaling overheads.

With reference to the second embodiment of the eighth aspect or the third embodiment of the eighth aspect, in a fourth embodiment of the eighth aspect, a first correspondence exists between the status index value and the status, and the first correspondence is predefined, or is configured by the network device. Based on this possible design, a correspondence between a status index value and a status may be predefined, or the correspondence between a status index value and a status may be configured by the network device. This is simple and easy to implement.

With reference to the eighth aspect or the first embodiment of the eighth aspect, in a fifth embodiment of the eighth aspect, the power saving signal includes K sub-status index value groups. The K sub-status index value groups correspondingly indicate the statuses of the terminal on the N frequency resource units. K is a positive integer, and K is less than or equal to N. Based on this possible design, a sub-status index value correspondingly indicating the information included in the status of the terminal may be included in the power saving signal and sent to the terminal.

With reference to the fifth embodiment of the eighth aspect, in a sixth embodiment of the eighth aspect, when K is less than N, at least one of the K sub-status index value groups correspondingly indicates statuses of the terminal on at least two of the N frequency resource units. Based on this possible design, the status index value group may be used to indicate the statuses of the terminal on the two or more frequency resource units, to reduce the signaling overheads.

With reference to the fifth embodiment of the eighth aspect or the sixth embodiment of the eighth aspect, in a seventh embodiment of the eighth aspect, each sub-status index value group includes at least one sub-status index value, and a second correspondence exists between the sub-status index value and one piece of information included in the status. The second correspondence is predefined, or is configured by the network device. Based on this possible design, a correspondence between a sub-status index value and information included in a status may be predefined, or the correspondence between a sub-status index value and information included in a status may be configured by the network device. This is simple and easy to implement.

With reference to any one of the eighth aspect or the embodiments of the eighth aspect, in an eighth embodiment of the eighth aspect, the frequency resource unit is a carrier or a BWP. Based on this possible design, the power saving signal delivered by the network device may indicate a status of the terminal on the carrier or in the BWP. It should be noted that, in this embodiment of this application, the frequency resource unit may be alternatively described as a frequency domain resource unit or may have another name. This is not limited.

According to a ninth aspect, a communications apparatus is provided. The communications apparatus may be a terminal, a chip in a terminal, or a system-on-a-chip. The communications apparatus may implement functions performed by the terminal in the foregoing aspects or the possible designs. The functions may be implemented by hardware. For example, in a possible design, the communications apparatus may include a processor and a communications interface. The processor may be configured to support the communications apparatus in implementing the function in any one of the seventh aspect or the possible designs of the seventh aspect. For example, the processor generates a power saving signal used to indicate statuses of the terminal on N frequency resource units, where N is an integer greater than 1. The power saving signal is sent to the terminal through the communications interface. Each of the statuses of the terminal on the frequency resource units may include at least one piece of the following information:

information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling. In still another possible design, the communications apparatus may further include a memory. The memory is configured to store a computer-executable instruction and data that are necessary for the communications apparatus. When the communications apparatus runs, the processor executes the computer-executable instruction stored in the memory, so that the communications apparatus performs the communication method according to any one of the seventh aspect or the possible designs of the seventh aspect.

According to a tenth aspect, a computer-readable storage medium is provided. The computer-readable storage medium may be a readable non-volatile storage medium, and the computer-readable storage medium stores an instruction. When the instruction is run on a computer, the computer is enabled to perform the communication method according to any one of the seventh aspect or the possible designs of the foregoing aspect.

According to an eleventh aspect, a computer program product including an instruction is provided. When the computer program product runs on a computer, the computer is enabled to perform the communication method according to any one of the seventh aspect or the possible designs of the foregoing aspect.

According to a twelfth aspect, a communications apparatus is provided. The communications apparatus may be a terminal, a chip in a terminal, or a system-on-a-chip. The communications apparatus includes one or more processors and one or more memories. The one or more memories are coupled to the one or more processors, and the one or more memories are configured to store computer program code. The computer program code includes a computer instruction, and when the one or more processors execute the computer instruction, the communications apparatus is enabled to perform the communication method according to any one of the seventh aspect or the possible designs of the seventh aspect.

For a technical effect achieved in any design mode of the ninth aspect to the twelfth aspect, refer to the technical effect achieved in any one of the seventh aspect or the possible designs of the seventh aspect. Details are not described herein again.

According to a thirteenth aspect, an embodiment of this application provides a communications system, including the terminal according to any one of the second aspect to the sixth aspect, and the network device according to any one of the eighth aspect to the twelfth aspect.

DESCRIPTION OF EMBODIMENTS

To facilitate understanding of a method provided in embodiments of this application, some terms in the embodiments of this application are explained before the embodiments of this application are described.

Carrier aggregation (carrier aggregation, CA): Two or more component carriers (component carrier, CC) are aggregated to support a wider transmission bandwidth (for example, 100 megahertz (MHz)). Each CC corresponds to an independent cell (cell), one CC may be equivalent to one cell, and a maximum bandwidth of each CC is 20 MHz. A 3GPP protocol specifies that one terminal may be configured with a plurality of CCs (for example, a maximum of five CCs or 32 CCs may be configured). In the plurality of CCs of the terminal, one of the CCs may be referred to as a primary cell (primary cell, PCell), and is a cell on which the terminal performs initial connection establishment, or a cell on which the terminal performs radio resource control (radio resource control, RRC) connection reestablishment, or a primary cell designated in a handover (handover) process. The PCell is responsible for RRC communication with the terminal. A PUCCH can be transmitted only on the PCell. A remaining CC is referred to as a secondary cell (secondary cell, SCell). The SCell is added during RRC reconfiguration of the terminal, and is used to provide an additional radio resource.

A bandwidth part (bandwidth part, BWP) is a part of a system bandwidth. The system bandwidth may be a bandwidth of one carrier, and the system bandwidth may be very wide, for example, 200 MHz or 400 MHz. Some terminals cannot support such a wide system bandwidth. Therefore, a network device may configure the BWP (the part of the system bandwidth) for the terminal, for example, 20 MHz, so that the terminal may communicate with the network device in 20 MHz. The BWP may be classified into a downlink BWP (downlink BWP, DL BWP) and an uplink BWP (uplink BWP, UP BWP). The network device may configure a plurality of DL BWPs and a plurality of UL BWPs for the terminal, and activate (active) at least one DL BWP and at least one UL BWP. The terminal receives, in the activated DL BWP, a downlink signal sent by the network device, including but not limited to downlink control signaling and downlink data. The terminal sends an uplink signal in the activated UL BWP, including but not limited to uplink control signaling, uplink data, a scheduling request (scheduling request, SR), a channel sounding reference signal (sounding reference signal, SRS), channel state information (channel state information, CSI)/a channel quality indicator (channel quality indicate, CQI) feedback, and the like.

Figure 1:
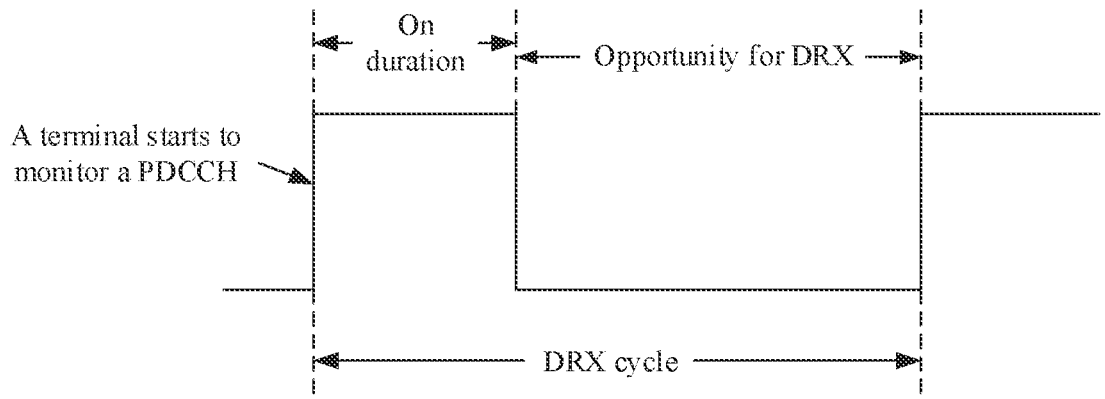
FIG. 1 is a schematic diagram of a C-DRX cycle.

Discontinuous reception (discontinuous reception, DRX) may be referred to as connected discontinuous reception (connected discontinuous reception, C-DRX). A basic principle of the C-DRX is that a C-DRX cycle (cycle) is configured for a terminal in an RRC_CONNECTED state. FIG. 1 is a schematic diagram of the C-DRX cycle. As shown in FIG. 1, the C-DRX cycle may include an active time "on duration" and a dormant time "opportunity for DRX". In "on duration" time, a terminal monitors and receives a physical downlink control channel (physical downlink control channel, PDCCH). In "opportunity for DRX" time, the terminal does not receive the PDCCH to reduce power consumption. A length of the C-DRX cycle and lengths of the active time and the dormant time are all configured by a base station for the terminal. Different CCs or BWPs may have different C-DRX cycles or may have a same C-DRX cycle. This is not limited.

PDCCH monitoring may mean that a terminal may receive a downlink signal, and then perform blind detection on a series of PDCCH candidates (candidate) in the received downlink signal, to check whether there is a PDCCH sent to the terminal. A group of PDCCH candidates may constitute a search space set (search space set), and time-frequency resource locations occupied by the search space set are referred to as a control resource set (control resource set, CORESET). Different search space sets have different monitoring cycles. In addition, the search space set may be further classified into two types: a common search space set (common search space set) and a terminal-specific search space set (UE-specific search space set). The terminal monitors, in different types of search space sets, PDCCHs carrying downlink control information (downlink control information, DCI) in different formats (format). A specific format of the PDCCH to be monitored is configured by a network side for the terminal when the search space set is configured.

Cross-slot scheduling may refer to cross-slot scheduling of a PDCCH and a corresponding physical downlink data channel (physical downlink shared channel. PDSCH). For example, whether cross-slot scheduling is performed on the PDCCH and the corresponding PDSCH may be indicated by using a time interval K0 (a slot (slot) is used as a unit) between the PDCCH and the corresponding PDSCH.

The time interval K0 (the slot (slot) is used as a unit) between the PDCCH and the corresponding PDSCH is dynamically indicated by a base station. Specifically, values of K0 constitute a value set, and the set is configured by the base station by using RRC signaling. During one time of scheduling, the base station indicates, on the PDCCH, a value in the value set of K0. If K0 is equal to 0, it indicates that the PDCCH and PDSCH are in a same slot, and this is referred to as "same-slot scheduling". If K0 is greater than 0, it indicates that the PDCCH and PDSCH are not in a same slot, and this is referred to as "cross-slot scheduling". Generally, during cross-slot scheduling, a terminal can avoid buffering some useless data, to save energy. When the terminal knows that all values that are of K0 and that are indicated by the terminal are greater than 0, the terminal is definitely scheduled in a cross-slot manner. If the value set of K0 of the terminal includes 0, the terminal may be scheduled in a same-slot manner. In this case, the terminal cannot save energy.

Short sleep may also be referred to as "PDCCH skipping" (PDCCH skipping), and refers to a behavior that a terminal does not monitor a PDCCH in several slots, several milliseconds, or several PDCCH monitoring occasions (PDCCH occasion). Generally, the PDCCH skipping is dynamically indicated by a network side. For example, a network device may send one piece of indication information to the terminal, to indicate the terminal not to monitor the PDCCH in the several slots, the several milliseconds, or the several PDCCH monitoring occasions (PDCCH occasion), so as to save energy.

Measurement: In a process of communication between a terminal and a base station, the terminal not only receives and sends data, but also receives or sends a reference signal (reference signal, RS). The RS may be used for various measurements, and the terminal may perform measurement based on the RS. For example, the terminal receives a channel state information reference signal (channel state information reference signal, CSI-RS) sent by the base station, then uses the signal to perform channel state measurement, and feeds back a measurement result to the base station based on configuration/indication information of the base station, so that the base station better performs data scheduling, for example, adjusts a modulation and coding scheme (modulation and coding scheme, MCS) or determines a precoding matrix of multiple-input multiple-output (multi-input multi-out, MIMO). For another example, the terminal receives a synchronization signal block (synchronization signal block, SSB) and/or a CSI-RS sent by the base station, and then performs radio resource management (radio resource management, RRM) measurement, radio link management (radio link management, RLM) measurement, and/or beam management (beam management, BM) measurement by using the signal, to determine current link quality.

It should be noted that RS receiving and measurement may be considered as two different steps. To be specific, the former is to receive a signal, and the latter is to process the signal. It may alternatively be considered that "measurement" includes receiving and also includes signal processing.

Currently, to reduce power consumption of the terminal, optimization may be performed from two aspects, 1. When a service is carried (in other words, data needs to be transmitted), data transmission efficiency is increased, 2. When no service is carried (in other words, no data needs to be transmitted), energy consumption of the terminal is reduced. As for the second point, it is mentioned in a report of the International Telecommunication Union-Radiocommunication Sector (international telecommunication union-radiocommunications sector, ITU-R) that the energy consumption of the terminal may be reduced by increasing a proportion in which the terminal in a sleep state. For example, the network device may send a power saving signal (power saving signal) based on a physical downlink control channel (physical downlink control channel, PDCCH) to the terminal. The power saving signal may be used to indicate that the terminal is in a sleep state or a wake-up state in one or more next connected discontinuous reception (connected discontinuous reception, C-CRX) cycles (cycle). After receiving the power saving signal, the terminal may be in the sleep state or in the wake-up state based on an indication of the power saving signal, so that in the sleep state, some circuits of the terminal are disabled to reduce the energy consumption of the terminal.

However, in a working process of the terminal, in addition to monitoring the PDCCH, there are many operations that increase the power consumption of the terminal. How to reduce the power consumption of the terminal to a maximum extent becomes a problem that needs to be resolved urgently. Therefore, an embodiment of this application provides a communication method, to monitor more statuses of a terminal other than a PDCCH by using a power saving signal. For details about the method, refer to the following.

The following describes implementations of this embodiment of this application in detail with reference to accompanying drawings.

The power control method provided in this embodiment of this application may be applied to any communications system that supports carrier aggregation or supports simultaneous working of a plurality of active BWPs. The communications system may be a 3rd Generation Partnership Project (3rd generation partnership project, 3GPP) communications system, for example, a long term evolution (long term evolution, LTE) system. Alternatively, the communications system may be a 5th generation (5th generation, 5G) mobile communications system, a new radio (new radio, NR) system, an NR-vehicle-to-everything (vehicle-to-everything, V2X) communications system, and another next-generation communications system. Alternatively, the communications system may be a non-3GPP communications system. This is not limited. The following uses FIG. 2 as an example to describe the method provided in this embodiment of this application.

Figure 2:
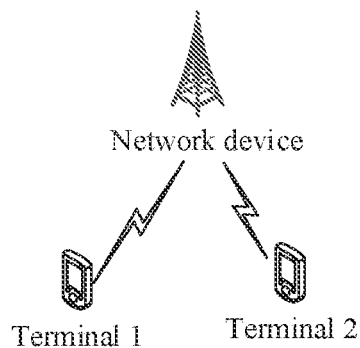
FIG. 2 is a simplified schematic diagram of a system architecture according to an embodiment of this application.

FIG. 2 is a schematic diagram of a communications system according to an embodiment of this application. As shown in FIG. 2, the communications system may include a network device and a plurality of terminals (for example, a terminal 1 and a terminal 2). The terminal may be located within a coverage area of the network device, the terminal may communicate with the network device through CA or a plurality of active BWPs, and the terminal may simultaneously work on a plurality of frequency resource units (CCs or BWPs). For example, the terminal may receive, on one or more CCs (or BWPs), data/information sent by the network device, or send data/information to the network device on one or more CCs (or BWPs).

The network device in FIG. 2 may be any device having a wireless transceiver function, and is mainly configured to implement functions such as a radio physical control function, resource scheduling and radio resource management, radio access control, and mobility management. Specifically, the network device may be an access network (access network, AN)/radio access network (radio access network, RAN) device, or may be a device including a plurality of 5G-AN/5G-RAN nodes, or may be a NodeB (nodeB, NB), an evolved NodeB (evolution nodeB, eNB), a next generation NodeB (generation nodeB, gNB), a transmission reception point (transmission receive point. TRP), a transmission point (transmission point, TP), a road side unit (road side unit, RSU), any node of some other access nodes, or the like. This is not limited.

The terminal (terminal equipment) in FIG. 2 may be referred to as user equipment (user equipment, UE), a mobile station (mobile station, MS), a mobile terminal (mobile terminal, MT), or the like. The terminal may be deployed on water (for example, on a steamship), or may be deployed in the air (for example, on an airplane, a balloon, and a satellite). Specifically, the terminal in FIG. 2 may be a mobile phone (mobile phone), a tablet computer, or a computer having the wireless transceiver function. Alternatively, the terminal may be a virtual reality (virtual reality, VR) terminal, an augmented reality (augmented reality, AR) terminal, a wireless terminal in industrial control, a wireless terminal in unmanned driving, a wireless terminal in telemedicine, a wireless terminal in a smart grid, a wireless terminal in a smart city (smart city), a wireless terminal in a smart home (smart home), a vehicle-mounted terminal, a vehicle having a V2V communication capability, or the like. This is not limited.

In the communications system shown in FIG. 2, to reduce power consumption of the terminal to a maximum extent, the network device may send a power saving signal (power saving signal) to the terminal, to indicate statuses of the terminal on the plurality of frequency resource units by using the power saving signal, for example, indicate the terminal to monitor the physical downlink control channel PDCCH or not to monitor the PDCCH, indicate a manner in which the terminal monitors the PDCCH, indicate the terminal to perform channel state information CSI measurement or not to perform the CSI measurement, indicate an active bandwidth part BWP on which the terminal is located, indicate a quantity of receive antennas of the terminal, indicate a quantity of receive layers of the terminal, indicate a maximum quantity of receive layers of the terminal, indicate a quantity of transmit antennas of the terminal, indicate a quantity of transmit layers of the terminal, indicate a maximum quantity of transmit layers of the terminal, and indicate the terminal to perform cross-slot scheduling or not to perform cross-slot scheduling, so that the terminal adjusts, based on the power saving signal, a status of the terminal to the status indicated by the network device, to reduce power consumption of the terminal. Specifically, for this process, refer to description in the embodiment corresponding to FIG. 4.

It should be noted that FIG. 2 is merely an example framework diagram. A quantity of nodes included in FIG. 2 is not limited. In addition to the function nodes shown in FIG. 2, the communications system shown in FIG. 2 may further include another node, for example, a core network device, a gateway device, or an application server. This is not limited.

Figure 3:
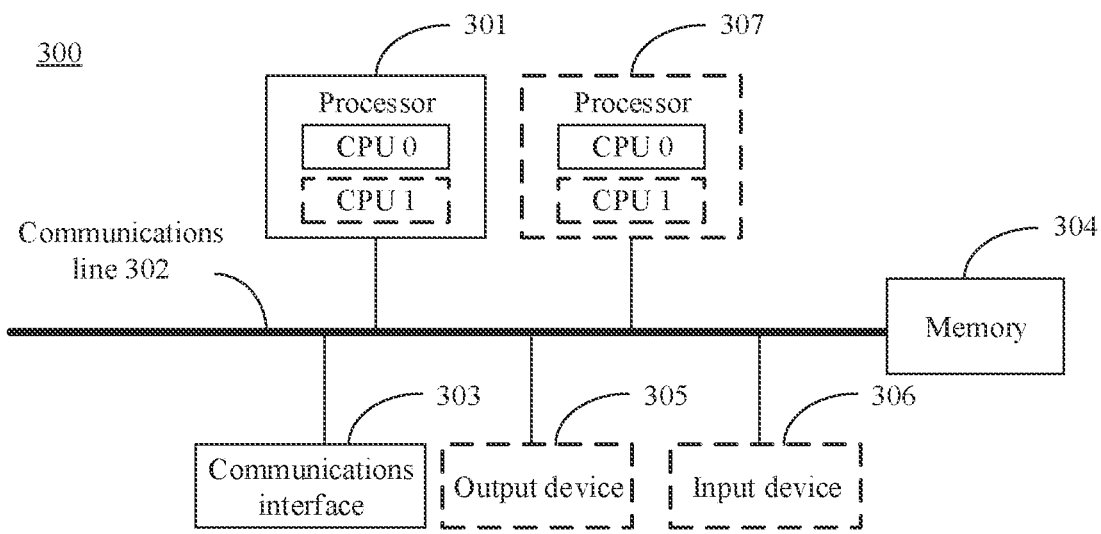
FIG. 3 is a schematic composition diagram of a communications apparatus according to an embodiment of this application.

In specific implementation, the terminal or the network device in FIG. 2 may include components shown in FIG. 3. FIG. 3 is a schematic composition diagram of a communications apparatus 300 according to an embodiment of this application. The communications apparatus 30) is configured to implement the communication method provided in the embodiments of this application. As shown in FIG. 3, the communications apparatus 300 includes at least one processor 301, a communications line 302, and at least one communications interface 303. Further, the communications apparatus 300 may further include a memory 304. The processor 301, the memory 304, and the communications interface 303 may be connected to each other through the communications line 302. In this embodiment of this application, "at least one" may be one, two, three, or more. This is not limited in this embodiment of this application.

The processor 301 may be a central processing unit (central processing unit, CPU), a general-purpose processor, a network processor (network processor, NP), a digital signal processor (digital signal processing, DSP), a microprocessor, a microcontroller, a programmable logic device (programmable logic device, PLD), or any combination thereof. The processor may alternatively be any other apparatus having a processing function, for example, a circuit, a component, or a software module.

The communications line 302 may include a path, configured to transmit information between components included in the communications apparatus.

The communications interface 303 is configured to communicate with another device or a communications network (for example, the Ethernet, a radio access network (radio access network, RAN), or a wireless local area network (wireless local area networks, WLAN)). The communications interface 303 may be a module, a circuit, a transceiver, or any apparatus that can implement communication.

The memory 304 may be a read-only memory (read-only memory, ROM) or another type of static storage device that can store static information and an instruction, or a random access memory (random access memory, RAM) or another type of dynamic storage device that can store information and an instruction. Alternatively, the memory 304 may be an electrically erasable programmable read-only memory (electrically erasable programmable read-only memory. EEPROM), a compact disc read-only memory (compact disc read-only memory. CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 304 is not limited thereto.

In a possible design, the memory 304 may be independent of the processor 301. To be specific, the memory 304 may be a memory outside the processor 301. In this case, the memory 304 may be connected to the processor 301 through the communications line 302, and is configured to store an instruction or program code. When invoking and executing the instruction or the program code stored in the memory 304, the processor 301 can implement a communication method provided in the following embodiment of this application. In still another possible design, the memory 304 may alternatively be integrated with the processor 301. To be specific, the memory 304 may be an internal memory of the processor 301. For example, the memory 304 is a cache, and may be configured to temporarily store some data, instruction information, and/or the like.

In a possible implementation, the processor 301 may include one or more CPUs, for example, a CPU 0 and a CPU 1 in FIG. 3. In another possible implementation, the communications apparatus 300 may include a plurality of processors, for example, the processor 301 and a processor 307 in FIG. 3. In still another possible implementation, the communications apparatus 300 may further include an output device 305 and an input device 306. For example, the input device 306 may be a device, for example, a keyboard, a mouse, a microphone, or a joystick, and the output device 305 may be a device, for example, a display screen or a speaker (speaker).

It should be noted that the communications apparatus 300 may be a general-purpose device or a special-purpose device. For example, the communications apparatus 300 may be a desktop computer, a portable computer, a network server, a PDA, a mobile phone, a tablet computer, a wireless terminal, an embedded device, a chip system, or a device with a structure similar to that in FIG. 3. A type of the communications apparatus 300 is not limited in this embodiment of this application. In this embodiment of this application, the chip system may include a chip, or may include a chip and another discrete component.

The following describes the communication method provided in the embodiments of this application with reference to the communications system shown in FIG. 2. Each device in the following method embodiment may have components shown in FIG. 3, and details are not described again. In addition, a name of a message exchanged between network elements, a name of a parameter in the message, or the like in the following embodiments of this application is merely an example, and may have another name in a specific implementation. This is not specifically limited in this embodiment of this application. For example, the following power saving signal may be alternatively named a first signal or the like. In addition, terms such as "first" and "second" in the embodiments of this application are used to distinguish different objects, but are not used to describe a specific sequence of the objects. Attributes of different objects represented by "first" and "second" are not limited in the embodiments of this application.

Figure 4:
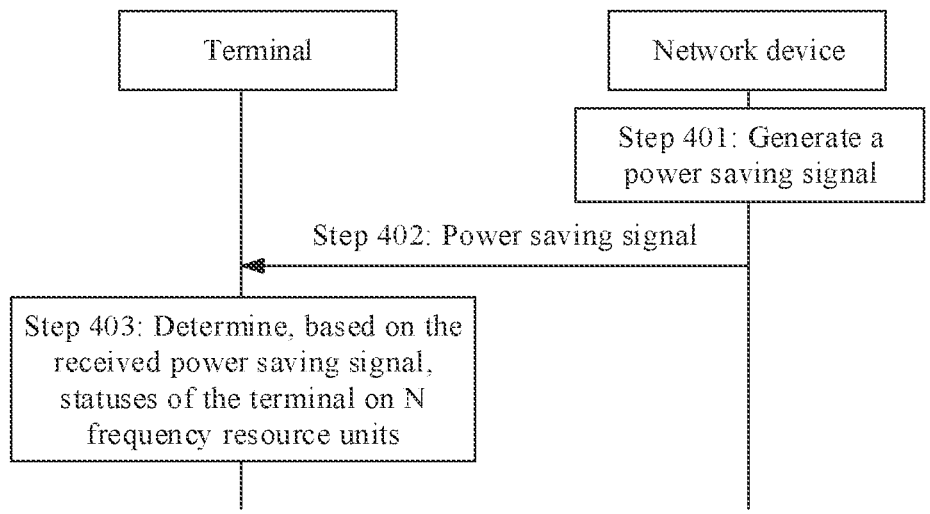
FIG. 4 is a flowchart of a communication method according to an embodiment of this application.

FIG. 4 is a flowchart of a communication method according to an embodiment of this application. As shown in FIG. 4, the method may include the following steps.

Step 401: A network device generates a power saving signal.

The network device may be the network device in FIG. 2.

The power saving signal may be used to indicate statuses of a terminal on N frequency resource units. The terminal may be any device that communicates with the network device in a CA manner or a manner of a plurality of active BWPs. The frequency resource unit may be a BWP, a CC, a cell, or a frequency domain resource of another granularity. This is not limited. N is an integer greater than 1. For example, the N frequency resource units may be two or more frequency resource units. The power saving signal may be used to indicate statuses of the terminal on the two or more frequency resource units. It should be noted that the frequency resource unit may be alternatively described as a frequency domain resource unit or may have another name. This is not limited.

Each of the statuses of the terminal on the frequency resource units may include at least one piece of the following information: information that the terminal monitors a PDCCH or does not monitor a PDCCH, information about a manner in which the terminal monitors the PDCCH, information that the terminal performs CSI measurement or does not perform CSI measurement, information about an active bandwidth part BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling. It should be noted that the statuses of the terminal on the frequency resource units are not limited in this application. In addition to the information, each of the statuses of the terminal on the frequency resource units may further include: information that the terminal performs RRM measurement or does not perform RRM measurement, information that the terminal performs RLM measurement or does not perform RLM measurement, information that the terminal performs BM measurement or does not perform BM measurement, and information about another status that affects power consumption of the terminal. This is not limited.

The manner in which the terminal monitors the PDCCH may include at least one of the following: a search space set monitored when the terminal monitors the PDCCH, a format of the PDCCH monitored by the terminal, and a manner in which the terminal performs short sleep when monitoring the PDCCH. For example, the format of the PDCCH monitored by the terminal may include: monitoring all PDCCHs or monitoring some PDCCHs (monitoring only a part of a CORESET, a part of the search space set, or the like), for example, monitoring only a PDCCH in a common search space set but not monitoring a UE specific search space set; or monitoring only some DCI formats, for example, monitoring only a group common PDCCH (group common PDCCH) (for example, a slot structure indicator (slot format indication, SFI)) in a common search space set but not monitoring a PDCCH (scheduling PDCCH) carrying scheduling information; or monitoring all PDCCHs that need to be monitored in a common search space set. The manner in which the terminal performs short sleep when monitoring the PDCCH includes: a duration of the short sleep, a monitoring cycle of short sleep indication information, and/or the like. This is not limited. The duration of the short sleep may refer to a time length for which the terminal sleeps after receiving the short sleep indication information within an active time "on duration". The monitoring cycle of the short sleep indication information may refer to a time interval at which the terminal monitors the short sleep indication in the active time "on duration". The short sleep indication information may be used to indicate the terminal to monitor the PDCCH or not monitor the PDCCH.

If the terminal performs the CSI measurement, the power consumption of the terminal is increased. If the terminal does not perform the CSI measurement, the power consumption of the terminal can be reduced. For related descriptions of the CSI measurement, refer to the foregoing descriptions. Details are not described again.

The active BWP on which the terminal is located may be a bandwidth value of the active BWP on which the terminal is located. In this application, a wider active BWP bandwidth indicates more power consumption of the terminal. On the contrary, a narrower active BWP bandwidth indicates less power consumption of the terminal.

The quantity of receive antennas of the terminal may be a maximum quantity of receive antennas supported by the terminal, and the quantity of transmit antennas of the terminal may be a maximum quantity of transmit antennas supported by the terminal. In this application, a larger quantity of receive antennas of the terminal/a larger quantity of transmit antennas of the terminal indicates more energy consumption of the terminal. A smaller quantity of receive antennas of the terminal/a smaller quantity of transmit antennas of the terminal indicates less power consumption of the terminal.

The quantity of receiving layers of the terminal and the maximum quantity of receiving layers of the terminal may reflect a quantity of receiving layers supported by the terminal. In this application, a larger quantity of receiving layers of the terminal/a larger maximum quantity of receiving layers of the terminal indicates more energy consumption of the terminal. A smaller quantity of receiving layers of the terminal/a smaller maximum quantity of receiving layers of the terminal indicates less energy consumption of the terminal.

The quantity of transmit layers of the terminal and the maximum quantity of transmit layers of the terminal may reflect a quantity of transmit layers supported by the terminal. In this application, a larger quantity of transmit layers of the terminal/a larger maximum quantity of transmit layers of the terminal indicates more energy consumption of the terminal. A smaller quantity of transmit layers of the terminal/a smaller maximum quantity of transmit layers of the terminal indicates less energy consumption of the terminal.

That the terminal performs cross-slot scheduling or does not perform cross-slot scheduling may be as described above. When a time interval K0 between the PDCCH and a corresponding PDSCH is 0, the PDCCH and the PDSCH are in a same slot, and the terminal does not perform cross-slot scheduling. On the contrary, if K0>0, it indicates that the PDCCH and the PDSCH are not in the same slot, and the terminal performs cross-slot scheduling.

For example, in the embodiments of this application, for a specific implementation form of the power saving signal, refer to Manner 1. The power saving signal includes status index values corresponding to the statuses, and the statuses of the terminal on the frequency resource units are indicated by using the status index values corresponding to the statuses. Alternatively, for a specific implementation of the power saving signal, refer to Manner 2. The power saving signal includes sub-status index values one-to-one corresponding to information included in the statuses, and the statuses of the terminal on the frequency resource units are jointly indicated by using the sub-status index values corresponding to the information included in the statuses.

Step 402: The network device sends the power saving signal to the terminal.

The power saving signal may be included in DCI or an RS.

For example, the network device may send the power saving signal to the terminal on one of the N frequency resource units. For example, the network device may send the power saving signal to the terminal on a primary cell, a PScell, or an active BWP.

In this way, the network device may indicate statuses of the terminal on a plurality of frequency resource units by sending the power saving signal on only one frequency resource unit, and does not need to send the power saving signal on each frequency resource unit to indicate the statuses of the terminal on the frequency resource units. This reduces signaling overheads.

Step 403. The terminal receives the power saving signal sent by the network device, and determines the statuses of the terminal on the N frequency resource units based on the received power saving signal.

For example, the terminal may receive, on one of the N frequency resource units, the power reference signal sent by the network device. For example, the terminal may receive, on the primary cell, the PScell, or the active BWP, the power saving signal sent by the network device.

In this application, when the specific implementation of the power saving signal is described in Manner 1, the terminal may determine the statuses of the terminal on the N frequency resource units based on a correspondence between the status and the status index value. Alternatively, when the specific implementation of the power saving signal is described in Manner 2, the terminal may determine the statuses of the terminal on the N frequency resource units based on a correspondence between the information included in the status and the sub-status index value.

It should be noted that content indicated by the power saving signal is not limited in this embodiment of this application. In addition to indicating the statuses of the terminal on the N frequency resource units, the power saving signal may be further used to indicate specific time or other information of the statuses of the terminal on the N frequency resource units. This is not limited. For example, the power saving signal may be used to indicate statuses of the terminal on the N frequency resource units in one or more C-DRX cycles. After receiving the power saving signal, the terminal may correspondingly adjust, in the one or more C-DRX cycles, a status of the terminal to the status indicated by the power saving signal.

Based on the method shown in FIG. 4, the network device may generate the power saving signal and send the power saving signal to the terminal, to indicate, to the terminal, indication information other than information about whether to monitor the PDCCH, for example, a plurality of pieces of information such as a specific manner in which the terminal monitors the PDCCH (including the search space set monitored when the terminal monitors the PDCCH, the format of the PDCCH monitored by the terminal, or the manner in which the terminal performs short sleep when monitoring the PDCCH), the information that the terminal performs the CSI measurement or does not perform the CSI measurement, the information about the active BWP on which the terminal is located, the information about the quantity of receive antennas of the terminal, the information about the quantity of receiving layers of the terminal, the information about the maximum quantity of receiving layers of the terminal, the information about the quantity of transmit antennas of the terminal, the information about the quantity of transmit layers of the terminal, the information about the maximum quantity of transmit layers of the terminal, and the information that the terminal performs cross-slot scheduling or does not perform cross-slot scheduling. After receiving the power saving signal, the terminal may determine the statuses of the terminal on the plurality of frequency resource units according to an instruction of the network device, so that the terminal adjusts a current status of the terminal to the determined status. In this way, a behavior of the terminal may be controlled from a plurality of aspects, so that when no service is carried, the terminal disables some functions of the terminal for the plurality of frequency resource units, to reduce the power consumption of the terminal.

In the method shown in FIG. 4, an implementation of the power saving signal may be shown in Manner 1 or Manner 2.

Manner 1: The power saving signal includes M status index values, the M status index values correspondingly indicate the statuses of the terminal on the N frequency resource units, M is a positive integer, and M is less than or equal to N.

The status index value may include one or more binary bits, and each status index value may correspondingly indicate statuses of the terminal on one or more frequency resource units. The status may include one or more pieces of information as described above. To be specific, each status index value may jointly indicate a plurality of pieces of information included in the status of the terminal on the frequency resource unit. A quantity of bits included in the status index value is related to a quantity of pieces of the information included in the status. A value range of the status index value needs to indicate a plurality of possible combinations corresponding to the plurality of pieces of information included in the status of the terminal on the frequency resource unit. For example, a first correspondence may exist between the status index value and the status of the terminal on the frequency resource unit. The first correspondence may be predefined, or may be configured by the network device. For example, the network device may configure the first correspondence for the terminal by using dynamic signaling (for example, the DCI or other signaling).

For example, Table 1 shows a correspondence between a status index value and a status of the terminal on a frequency resource unit. The status of the terminal on the frequency resource unit may include two pieces of information: information that the terminal monitors the PDCCH or does not monitor the PDCCH, and information that the terminal performs the CSI measurement or does not perform the CSI measurement. As shown in Table 1, there may have four possible statuses, and a status index value corresponding to each case may be as follows: When a status 1 indicates that neither the PDCCH is monitored nor the CSI measurement is performed, the status index value is 00. When a status 2 indicates that the PDCCH is not monitored but the CSI measurement is performed, the status index value is 01. When a status 3 indicates that some PDCCHs are monitored and the CSI measurement is performed, the status index value is 10. When a status 4 indicates that all PDCCHs are monitored and the CSI measurement is performed, the status index value is 11.

TABLE 1

| Status index value | Status |
| --- | --- |
| 00 | Neither the PDCCH is monitored nor the CSI measurement is performed |
| 01 | The PDCCH is not monitored but the CSI measurement is performed |
| 10 | Some PDCCHs are monitored and the CSI measurement is performed |
| 11 | All PDCCHs are monitored and the CSI measurement is performed |

When M is equal to N, the M status index values may indicate the statuses of the terminal on the N frequency resource units in a one-to-one correspondence. When M is less than N, at least one of the M status index values correspondingly indicates statuses of the terminal on at least two of the N frequency resource units.

For example, the terminal is configured with five CCs: a CC 1 to a CC 5, and the power saving signal may include five status index values. The five status index values may one-to-one correspond to the five CCs, and one status index value is used to indicate a status of the terminal on one CC. Alternatively, the power saving signal may include three status index values: an index 1, an index 2, and an index 3. The index 1 may be used to indicate a status of the terminal on the CC 1, the index 2 may be used to indicate statuses of the terminal on the CC 2 to the CC 4, and the index 3 may be used to indicate a status of the terminal on the CC 5.

For another example, it is assumed that the first correspondence includes three statuses and status index values corresponding to the three statuses. A status 1 indicates that the PDCCH is not monitored, and a status index value is 00. A status 2 indicates that only the PDCCH in the common search space set is monitored, and a status index value is 01. A status 3 indicates that all PDCCHs are monitored, and a status index value is 10. In this case, if the terminal is configured with three cells, the network device sends the power saving signal to the terminal on a cell 1, to indicate statuses of the three cells. For example, the power saving signal includes the following three status index values: 10, 01, and 00. The three status index values respectively correspond to the statuses of the terminal on the cell 1, a cell 2, and a cell 3. In this case, the terminal may learn, based on the status index value 10 included in the power saving signal and the first correspondence, that the terminal monitors all the PDCCHs on the cell 1. The terminal may learn, based on the status index value 01 included in the power saving signal and the first correspondence, that only the PDCCH in the common search space set is monitored on the cell 2. The terminal may learn, based on the status index value 00 included in the power saving signal and the first correspondence, that the PDCCH is not monitored on the cell 3.

For another example, it is assumed that the first correspondence includes four statuses and status index values corresponding to the four statuses. A status 1 indicates that the PDCCH is not monitored, and a status index value is 00. A status 2 indicates that only the group common PDCCH in the common search space set is monitored and the scheduling PDCCH is not monitored, and a status index value is 01. A status 3 indicates that all PDCCHs that need to be monitored in the common search space set are monitored, and a status index value is 10. A status 4 indicates that all PDCCHs are monitored, and a status index value is 11. In this case, if the terminal is configured with three cells, the network device sends the power saving signal to the terminal on a cell 1, to indicate statuses of the three cells. For example, the power saving signal includes the following three status index values: 11, 01, and 10. The three status index values respectively correspond to the statuses of the terminal on the cell 1, a cell 2, and a cell 3. In this case, the terminal may learn, based on the status index value 11 included in the power saving signal and the first correspondence, that the terminal monitors all the PDCCHs on the cell 1. The terminal may learn, based on the status index value 01 included in the power saving signal and the first correspondence, that the only the group common PDCCH in the common search space set is monitored and the scheduling PDCCH is not monitored on the cell 2. The terminal may learn, based on the status index value 10 included in the power saving signal and the first correspondence, that all the PDCCHs that need to be monitored in the common search space set are monitored on the cell 3.

For another example, it is assumed that the first correspondence includes four statuses and status index values corresponding to the four statuses. A status 1 indicates that neither the PDCCH is monitored nor the CSI measurement is performed, and a status index value 00. A status 2 indicates that the PDCCH is not monitored but the CSI measurement is performed, and a status index value 01. A status 3 indicates that some PDCCHs are monitored and the CSI measurement is performed, and a status index value 10. A status 4 indicates that all PDCCHs are monitored and the CSI measurement is performed, and a status index value 11. In this case, if the terminal is configured with four cells, the network device sends the power saving signal to the terminal on a cell 1, to indicate statuses of the four cells. For example, the power saving signal includes the following four status index values: 11, 01, 10, and 00. The four status index values respectively correspond to the statuses of the terminal on the cell 1, a cell 2, a cell 3, and a cell 4. In this case, the terminal may learn, based on the status index value 11 included in the power saving signal and the first correspondence, that the terminal monitors all the PDCCHs and performs the CSI measurement on the cell 1. The terminal may learn, based on the status index value 01 included in the power saving signal and the first correspondence, that the PDCCH is not monitored but the CSI measurement is performed on the cell 2. The terminal may learn, based on the status index value 10 included in the power saving signal and the first correspondence, that some PDCCHs are monitored and the CSI measurement is performed on the cell 3. The terminal may learn, based on the status index value 00 included in the power saving signal and the first correspondence, that neither the PDCCH is monitored nor the CSI measurement is performed on the cell 4.

For another example, the terminal is configured with three cells: a cell 1, a cell 2, and a cell 3. Two BWPs, namely, a BWP 1 and a BWP 2, are configured for the terminal on each cell. The first correspondence includes six statuses and status index values corresponding to the six statuses. A status 1 indicates that neither the PDCCH is monitored nor the CSI measurement is performed, the terminal is on the BWP 1, and a status index value is 000. A status 2 indicates that neither the PDCCH is monitored nor the CSI measurement is performed, the terminal is on the BWP 2, and a status index value is 001. A status 3 indicates that the PDCCH is not monitored but the CSI measurement is performed, the terminal is on the BWP 1, and a status index value is 010. A status 4 indicates that the PDCCH is not monitored but the CSI measurement is performed, the terminal is on the BWP 2, and the status index value is 011. A status 5 indicates that the PDCCH is monitored and the CSI measurement is performed, the terminal is on the BWP 1, and a status index value is 100. A status 6 indicates that the PDCCH is monitored and the CSI measurement is performed, the terminal is on the BWP 2, and a status index value is 101. In this case, the network device sends the power saving signal to the terminal on the cell 1, to indicate statuses of the three cells. For example, the power saving signal includes the following three status index values: 101, 011, and 000. The three status index values respectively correspond to the statuses of the terminal on the cell 1, the cell 2, and the cell 3. In this case, the terminal may learn, based on the status index value 101 included in the power saving signal and the first correspondence, that the terminal monitors the PDCCH and performs the CSI measurement on the cell 1, and the terminal is on the BWP 2. The terminal may learn, based on the status index value 011 included in the power saving signal and the first correspondence, that the PDCCH is not monitored but the CSI measurement is performed on the cell 2, and the terminal is on the BWP 2. The terminal may learn, based on the status index value 000 included in the power saving signal and the first correspondence, that neither the PDCCH is monitored nor the CSI measurement is performed on the cell 3, and the terminal is on the BWP 1.

For another example, the terminal is configured with three cells: a cell 1, a cell 2, and a cell 3. Two BWPs, namely, a BWP 1 and a BWP 2, are configured for the terminal on each cell. The first correspondence includes eight statuses and status index values corresponding to the eight statuses. A status 1 indicates that neither the PDCCH is monitored nor the CSI measurement is performed, the terminal is on the BWP 1, a maximum quantity of layers of the terminal is 2, and a status index value is 000. A status 2 indicates that neither the PDCCH is monitored nor the CSI measurement is performed, the terminal is on the BWP 2, a maximum quantity of layers of the terminal is 2, and a status index value is 001. A status 3 indicates that the PDCCH is not monitored but the CSI measurement is performed, the terminal is on the BWP 1, a maximum quantity of layers of the terminal is 2, and a status index value is 010. A status 4 indicates that the PDCCH is not monitored but the CSI measurement is performed, the terminal is on the BWP 2, a maximum quantity of layers of the terminal is 2, and a status index value is 011. The status 5 indicates that the PDCCH is monitored but the CSI measurement is performed, the terminal is on the BWP 1, a maximum quantity of layers of the terminal is 2, and a status index value is 100. A status 6 indicates that the PDCCH is monitored and the CSI measurement is performed, the terminal is on the BWP 2, a maximum quantity of layers of the terminal is 2, and a status index value is 101. A status 7 indicates that the PDCCH is monitored and the CSI measurement is performed, the terminal is on the BWP 1, a maximum quantity of layers of the terminal is 4, and a status index value is 110. A status 8 indicates that the PDCCH is monitored and the CSI measurement is performed, the terminal is on the BWP 2, a maximum quantity of layers of the terminal is 4, and a status index value is 111. In this case, the network device may send the power saving signal to the terminal on the cell 1, to indicate statuses of the three cells. For example, the power saving signal includes the following three status index values: 110, 101, and 100. The three status index values respectively correspond to the statuses of the terminal on the cell 1, the cell 2, and the cell 3. In this case, the terminal may learn, based on the status index value 110 included in the power saving signal and the first correspondence, that the terminal monitors the PDCCH and performs the CSI measurement on the cell 1, the terminal is on the BWP 2, and the maximum quantity of layers of the terminal is 4. The terminal may learn, based on the status index value 101 included in the power saving signal and the first correspondence, that the PDCCH is monitored and the CSI measurement is performed on the cell 2, the terminal is on the BWP 2, and the maximum quantity of layers of the terminal is 2. The terminal may learn, based on the status index value 100 included in the power saving signal and the first correspondence, that the PDCCH is monitored and the CSI measurement is performed on the cell 3, the terminal is on the BWP 1, and the maximum quantity of layers of the terminal is 2.

Manner 2: The power saving signal includes K sub-status index value groups, the K sub-status index value groups correspondingly indicate the statuses of the terminal on the N frequency resource units, K is a positive integer, and K is less than or equal to N.

Each sub-status index value group includes at least one sub-status index value, and the sub-status index value may be a binary bit "0" or "1", or an indicator. This is not limited. One sub-status index value may indicate one piece of information included in the status of the terminal on the frequency resource unit. A quantity of sub-status index values included in the sub-status index value group is the same as a quantity of pieces of information included in the status of the terminal on the frequency resource unit. To be specific, in Manner 2, the status of the terminal on the frequency resource unit may be indicated in a form of "separately encoding" each piece of information. For example, if the status that is of the terminal on the frequency resource unit and that is indicated by the power saving signal includes four pieces of information, the power saving signal may include a sub-status index value group. The sub-status index value group may include four binary bits, to correspondingly indicate the four pieces of information. It should be noted that a sequence of the sub-status index values in the sub-status index value group is not limited in this application.

For example, a second correspondence exists between the sub-status index value included in the sub-status index value group and information included in the status of the terminal on the frequency resource unit, and the second correspondence may be predefined, or may be configured by the network device. For example, the network device may configure the second correspondence for the terminal by using dynamic signaling (for example, the DCI or other signaling). For example, Table 2 shows a correspondence between a status index value and the status of the terminal on the frequency resource unit. The status of the terminal on the frequency resource unit may include two pieces of information: information that the terminal monitors the PDCCH or does not monitor the PDCCH, and information that the terminal performs the CSI measurement or does not perform the CSI measurement. As shown in Table 2, a sub-status index value corresponding to "the PDCCH is not monitored" is 0. A sub-status index value corresponding to "the PDCCH is monitored" is 1. A sub-status index value corresponding to "the CSI measurement is performed" is 0. A sub-status index value corresponding to "the CSI measurement is not performed" is 1.

TABLE 2

| Sub-status index value | Information included in the status |
| --- | --- |
| 0 | The PDCCH is not monitored |
| 1 | The PDCCH is monitored |
| 0 | The CSI measurement is performed |
| 1 | The CSI measurement is not performed |

When K is equal to N, the K status sub-index value groups may indicate the statuses of the terminal on the N frequency resource units in a one-to-one correspondence. When K is less than N, at least one of the K sub-status index value groups correspondingly indicates statuses of the terminal on at least two of the N frequency resource units. In other words, one sub-status index value group may be used to indicate the statuses of the terminal on the two or more frequency resource units.

For example, the second correspondence includes the following three pieces of information: information that the PDCCH is monitored or not monitored, the information about the active BWP on which the terminal is located, and the information about the maximum quantity of layers of the terminal. In addition, sub-status index values corresponding to the pieces of information may be as follows: The sub-status index value may be 1 when the PDCCH is monitored, or may be 0 when the PDCCH is not monitored. The sub-status index value may be 0 when the BWP is a BWP 1, or may be 1 when the BWP is a BWP 2. The sub-status index value may be 0 when the maximum quantity of layers of the terminal is 2, or may be 1 when the maximum quantity of layers of the terminal is 4. A sequence of the sub-status index values corresponding to the three pieces of information is: the information that the PDCCH is monitored or not monitored, the information about the active BWP on which the terminal is located, and the information about the maximum quantity of layers of the terminal. In this case, if the terminal is configured with three cells: a cell 1 to a cell 3, the network device may send the power saving signal to the terminal on the cell 1, to indicate statuses of the three cells. For example, the power saving signal includes the following three status index value groups: 110, 101, and 100. Each status index value group includes three sub-status index values that respectively correspond to the statuses of the terminal on the cell 1, the cell 2, and the cell 3. In this case, the terminal may learn, based on the status index value group 110 included in the power saving signal and the second correspondence, that the terminal monitors the PDCCH on the cell 1 and is on the BWP 2, and the maximum quantity of layers of the terminal is 2. The terminal may learn, based on the status index value group 101 included in the power saving signal and the second correspondence, that the PDCCH is monitored on the cell 2, the terminal is on the BWP 1, and the maximum quantity of layers of the terminal is 4. The terminal may learn, based on the status index value group 100 included in the power saving signal and the second correspondence, that the PDCCH is monitored on the cell 3, the terminal is on the BWP 1, and the maximum quantity of layers of the terminal is 2.

It should be noted that the network device may further indicate another status of the terminal on the frequency resource unit in Manner 2, for example, may indicate whether the terminal performs cross-slot scheduling on the frequency domain resource unit. When Manner 2 is used to indicate whether the terminal performs cross-slot scheduling, the following two implementations may be used: 1. The network device configures two K0 value sets for the terminal, where all values in one set are greater than 0. When the network device indicates the terminal to use the set, cross-slot scheduling may be implemented. For example, the network device configures only one K0 value set for the terminal, but indicates, to the terminal, a "minimum K0 value" during current scheduling. When the "minimum K0 value" is greater than 0, cross-slot scheduling may be implemented. When the K0 value set is a set 1, sub-status index values are 0. When the K0 value set is a set 2, sub-status index values are 1, 2. Alternatively, each value in a K0 value set has one sub-status index value. For example, K0={0, 1, 3, 5}, and corresponding sub-status index values are 0, 1, 2, and 3 respectively. If the network device indicates, to the terminal, that a sub-status index value of a minimum K0 value is 2, the terminal knows that a minimum K0 value is 3 when the terminal is scheduled, so that cross-slot scheduling may be implemented.

For another example, the network device may alternatively use the power saving signal designed in Manner 2 to indicate the manner in which the terminal performs short sleep on the frequency domain resource unit. For example, the power saving signal may include a sub-status index value (for example, a binary bit) used to indicate the short sleep manner of the terminal. One binary bit is used to indicate a time length of short sleep, where 0 indicates that a short sleep time is two slots, and 1 indicates that the short sleep time is four slots. In this way, if the sub-status index value included in the power saving signal is 0, after receiving the power saving signal, the terminal may determine, based on the sub-status index value corresponding to the short sleep manner of the terminal, that the short sleep time is two slots. If the sub-status index value included in the power saving signal is 1, after receiving the power saving signal, the terminal may determine, based on the sub-status index value corresponding to the short sleep manner of the terminal, that the short sleep time is four slots. Alternatively, one binary bit is used to indicate the monitoring cycle of the short sleep indication, where 0 indicates that the monitoring cycle of the short sleep indication information is three slots, and 1 indicates that the monitoring cycle of the short sleep indication information is five slots. In this way, if the sub-status index value included in the power saving signal is 0, after receiving the power saving signal, the terminal may determine, based on the sub-status index value corresponding to the short sleep manner of the terminal, to monitor the short sleep indication information by using three slots as a cycle. If the sub-status index value included in the power saving signal is 1, after receiving the power saving signal, the terminal may determine, based on the sub-status index value corresponding to the short sleep manner of the terminal, to monitor the short sleep indication information by using five slots as a cycle.

It should be noted that, in addition to the description, the plurality of pieces of information (for example, the information that the terminal performs the CSI measurement or does not perform the CSI measurement, the information about the active BWP on which the terminal is located, the information about the quantity of receive antennas of the terminal, the information about the quantity of receive layers of the terminal, the information about the maximum quantity of receive layers of the terminal, the information about the quantity of transmit antennas of the terminal, the information about the quantity of transmit layers of the terminal, and the information about the maximum quantity of transmit layers of the terminal) may be indicated to the terminal one by one in Manner 2. Alternatively, the plurality of pieces of information is jointly indicated to the terminal in Manner 1. For example, a status index value used to jointly indicate whether the terminal performs cross-slot scheduling or the short sleep manner of the terminal may be determined. The status index value is included in the power saving signal and sent to the terminal, so that the terminal determines, based on the status index value, whether the terminal performs cross-slot scheduling on the frequency resource unit, and determines the short sleep manner of the terminal.

It may be understood that, with reference to the foregoing method in which the network device indicates the statuses of the plurality of frequency resource units to the terminal by using the power saving signal, the network device may further indicate, to the terminal, the another status that affects the power consumption of the terminal. Details are not described.

The foregoing mainly describes the solutions provided in the embodiments of this application from a perspective of interaction between nodes. It may be understood that to implement the foregoing functions, the nodes, such as the terminal and the network device, include a corresponding hardware structure and/or software module for performing each function. A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into the functional modules may be performed on the first device and the second device based on the foregoing method example. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 5:
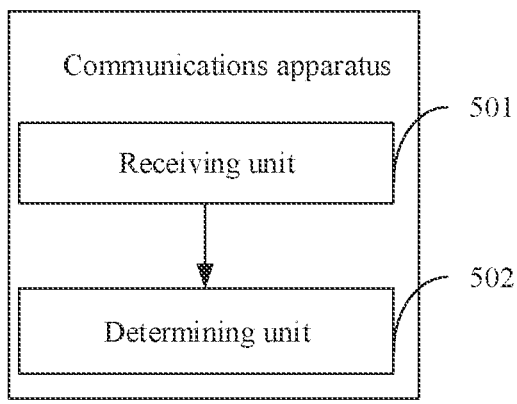
FIG. 5 is a schematic composition diagram of a communications apparatus 50 according to an embodiment of this application.

FIG. 5 is a structural diagram of a communications apparatus 50. The communications apparatus 50 may be a terminal, a chip in a terminal, or a system-on-a-chip. The communications apparatus 50 may be configured to perform functions of the terminal in the foregoing embodiments. In a possible implementation, the communications apparatus 50 shown in FIG. 5 includes a receiving unit 501 and a determining unit 502.

The receiving unit 501 is configured to receive a power saving signal that is sent by a network device and that is used to indicate statuses of the terminal on N frequency resource units. For example, the receiving unit 501 may be configured to support the terminal in performing step 403.

The determining unit 502 is configured to determine the statuses of the terminal on the N frequency resource units based on the received power saving signal, where N is an integer greater than 1. Each of the statuses of the terminal on the N frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling. For example, the determining unit 502 may be configured to support the terminal in performing step 403.

It should be noted that all related content of the steps in the foregoing method embodiment may be cited in function descriptions of corresponding functional modules. Details are not described herein again. The communications apparatus 50 provided in this embodiment of this application is configured to perform the functions of the terminal in the foregoing communication method, and therefore can achieve a same effect as the foregoing communication method.

In still another possible implementation, the communications apparatus 50 shown in FIG. 5 may include a processing module and a communications module. The processing module is configured to control and manage an action of the communications apparatus 50. For example, the processing module may integrate a function of the determining unit 502, and is configured to support the communications apparatus 50 in performing step 403 and performing another process of the technology described in this specification. The communications module may be configured to integrate a function of the receiving unit 501, and is configured to support the communications apparatus 50 in performing step 403 and communication between the communications apparatus 50 and another network entity, for example, communication between the communications apparatus 50 and a functional module or a network entity shown in FIG. 2. Further, the communications apparatus 50 may further include a storage module, configured to store program code and data of the communications apparatus 50.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 50 shown in FIG. 5 may be the communications apparatus shown in FIG. 3.

Figure 6:
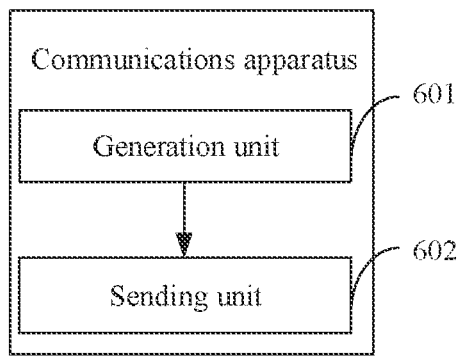
FIG. 6 is a schematic composition diagram of a communications apparatus 60 according to an embodiment of this application.

FIG. 6 is a structural diagram of a communications apparatus 60. The communications apparatus 60 may be a network device, a chip in a network device, or a system-on-a-chip. The communications apparatus 60 may be configured to perform functions of the network device in the foregoing embodiments. In a possible implementation, the communications apparatus 60 shown in FIG. 6 includes a generation unit 601 and a sending unit 602.

The generation unit 601 is configured to generate a power saving signal used to indicate statuses of a terminal on N frequency resource units, where N is an integer greater than 1. For example, the generation unit 601 may be configured to support the communications apparatus 60 in performing step 401.

The sending unit 602 is configured to send the power saving signal to the terminal. Each of the statuses of the terminal on the frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling. For example, the sending unit 602 may be configured to support the communications apparatus 60 in performing step 402.

In still another possible implementation, the communications apparatus 60 shown in FIG. 6 includes a processing module and a communications module. The processing module is configured to control and manage an action of the communications apparatus 60. For example, the processing module may integrate a function of the generation unit 601, and may be configured to support the communications apparatus 60 in performing step 401 and another process of the technology described in this specification. The communications module may integrate a function of the sending unit 602, and may be configured to support the communications apparatus 60 in performing step 402 and communicating with another network entity, for example, communicating with a functional module or a network entity shown in FIG. 2. The communications apparatus 60 may further include a storage module, configured to store program code and data of the communications apparatus 60.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 60 in this embodiment of this application may be the communications apparatus shown in FIG. 3.

Figure 7:
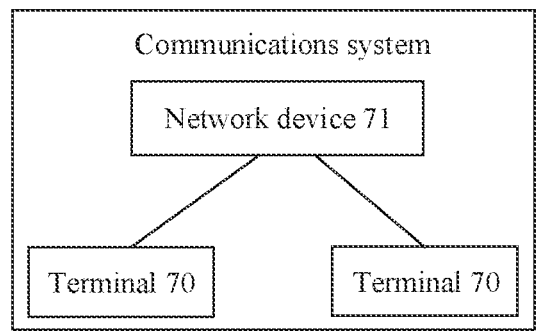
FIG. 7 is a schematic composition diagram of a communications system according to an embodiment of this application.

FIG. 7 is a structural diagram of a communications system according to an embodiment of this application. As shown in FIG. 7, the communications system may include a terminal 70 and a network device 71.

Functions of the network device 71 are similar to those of the communications apparatus 60 shown in FIG. 6. The network device 71 may be configured to generate a power saving signal used to indicate statuses of the terminal on N frequency resource units, and send the generated power saving signal to the terminal, where N is an integer greater than 1.

Functions of the terminal 70 are similar to those of the communications apparatus 50 shown in FIG. 5. The terminal 70 may be configured to receive the power saving signal sent by the network device 71, and determine the statuses of the terminal on the N frequency resource units based on the received power saving signal.

Each of the statuses of the terminal on the frequency resource units may include at least one piece of the following information: information that the terminal monitors a PDCCH or does not monitor the PDCCH, information about a manner in which the terminal monitors the PDCCH, information that the terminal performs CSI measurement or does not perform the CSI measurement, information about an active BWP on which the terminal is located, information about a quantity of receive antennas of the terminal, information about a quantity of receiving layers of the terminal, information about a maximum quantity of receiving layers of the terminal, information about a quantity of transmit antennas of the terminal, information about a quantity of transmit layers of the terminal, information about a maximum quantity of transmit layers of the terminal, and information that the terminal performs cross-slot scheduling or does not perform cross-slot scheduling.

It should be noted that all related content of the steps in the foregoing method embodiment may be cited in function descriptions of the corresponding functional entities in the embodiment shown in FIG. 4. Details are not described herein again.

Based on the communications system shown in FIG. 7, the terminal 70 may receive, from the network device 71, indication information other than the information about whether to monitor the PDCCH, for example, a plurality of pieces of information such as a specific manner in which the terminal monitors the PDCCH (including a search space set monitored when the terminal monitors the PDCCH, a format of the PDCCH monitored by the terminal, or a manner in which the terminal performs short sleep when monitoring the PDCCH), the information that the terminal 70 performs the CSI measurement or does not perform the CSI measurement, the information about the active BWP on which the terminal 70 is located, the information about the quantity of receive antennas of the terminal 70, the information about the quantity of receiving layers of the terminal 70, the information about the maximum quantity of receiving layers of the terminal 70, the information about the quantity of transmit antennas of the terminal 70, the information about the quantity of transmit layers of the terminal 70, the information about the maximum quantity of transmit layers of the terminal 70, and the information that the terminal 70 performs cross-slot scheduling or does not perform cross-slot scheduling. Statuses of the terminal 70 on a plurality of frequency resource units are determined based on an indication of the network device 71, so that the terminal 70 adjusts a current status of the terminal 70 to the determined status. In this way, a behavior of the terminal 70 may be controlled from a plurality of aspects, so that when no service is carried, the terminal 70 disables some functions of the terminal 70 for the plurality of frequency resource units, to reduce power consumption of the terminal 70.

The foregoing descriptions about implementations allow a person skilled in the art to clearly understand that, for the purpose of convenient and brief description, only division into the functional modules is used as an example for illustration. In actual application, the foregoing functions may be allocated to different functional modules and implemented based on a requirement. To be specific, an inner structure of an apparatus is divided into different functional modules to implement all or some of the functions described above.

In the several embodiments provided in this application, it should be understood that the disclosed apparatus and method may be implemented in another manner. For example, the apparatus embodiment described above is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method implemented by a communications apparatus, the communications apparatus is a terminal, a chip in a terminal, or a system on chip, comprising:
   receiving a power saving signal, wherein the power saving signal comprises M binary bits, and the M binary bits directly indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, and wherein the N carriers are comprised in M carrier groups, and each binary bit of the M binary bits indicates same statuses of the one terminal on all carriers of a respective carrier group; and
   determining the statuses of the one terminal on the N carriers based on the power saving signal, wherein each of the statuses of the one terminal on the N carriers comprises information that the one terminal monitors a physical downlink control channel (PDCCH) or does not monitor the PDCCH.

2. The method according to claim 1, wherein a first correspondence exists between the M binary bits and the statuses of the one terminal on the N carriers, and the first correspondence is predefined or is configured by a network device.

3. The method according to claim 1, wherein the power saving signal is comprised in DCI.

4. The method according to claim 3, wherein the receiving a power saving signal comprises:
   receiving, on a primary cell or a PScell, the power saving signal.

5. The method according to claim 1, wherein each of the N carriers is a component carrier (CC).

6. A communication method implemented by a communications apparatus, the communications apparatus is a terminal, a chip in a terminal, or a system on chip, wherein the method comprises:
   generating a power saving signal; and
   sending the power saving signal, wherein the power saving signal comprises M binary bits, and the M binary bits directly indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, wherein each of the statuses of the one terminal on the N carriers comprises information that the one terminal monitors a physical downlink control channel (PDCCH) or does not monitor the PDCCH, and wherein the N carriers are comprised in M carrier groups, and each binary bit of the M binary bits indicates same statuses of the one terminal on all carriers of a respective carrier group.

7. The method according to claim 6, wherein a first correspondence exists between the M binary bits and the statuses of the one terminal on the N carriers, and the first correspondence is predefined or is configured by a network device.

8. The method according to claim 6, wherein the power saving signal is comprised in DCI.

9. The method according to claim 6, wherein each of the N carriers is a component carrier (CC).

10. A communications apparatus, comprising:
    at least one processor;
    one or more memories coupled to the at least one processor and storing programming instructions for execution by the at least one processor to:
       receive a power saving signal, wherein the power saving signal comprises M binary bits, and the M binary bits are used to indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, and wherein the N carriers are comprised in M carrier groups, and each binary bit of the M binary bits indicates same statuses of the one terminal on all carriers of a respective carrier group; and
       determine the statuses of the one terminal on the N carriers based on the power saving signal, wherein each of the statuses of the one terminal on the N carriers comprises information that the one terminal monitors a physical downlink control channel (PDCCH) or does not monitor the PDCCH.

11. The communications apparatus according to claim 10, wherein a first correspondence exists between the M binary bits and the statuses of the one terminal on the N carriers, and the first correspondence is predefined or is configured by a network device.

12. The communications apparatus according to claim 10, wherein the power saving signal is comprised in DCI.

13. The communications apparatus according to claim 12, wherein receive a power saving signal comprises:
    receive, on a primary cell or a PScell, the power saving signal.

14. The communications apparatus according to claim 10, wherein each of the N carriers is a component carrier (CC).

15. A communications apparatus, comprising:
    at least one processor;
    one or more memories coupled to the at least one processor and storing programming instructions for execution by the at least one processor to:
    generate a power saving signal; and
    send the power saving signal, wherein the power saving signal comprises M binary bits, and the M binary bits directly indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, wherein each of the statuses of the one terminal on the N carriers comprises information that the one terminal monitors a physical downlink control channel (PDCCH) or does not monitor the PDCCH, and wherein the N carriers are comprised in M carrier groups, and each binary bit of the M binary bits indicates same statuses of the one terminal on all carriers of a respective carrier group.

16. The communications apparatus according to claim 15, wherein a first correspondence exists between the M binary bits and the statuses of the one terminal on the N carriers, and the first correspondence is predefined or is configured by a network device.

17. The communications apparatus according to claim 15, wherein the power saving signal is comprised in DCI.

18. The communications apparatus according to claim 15, wherein each of the N carriers is a component carrier (CC).

19. A computer-readable storage medium, comprising instructions, wherein when the instructions are run on a computer, the computer is enabled to:
- receive a power saving signal, wherein the power saving signal comprises M binary bits, and the M binary bits directly indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, and wherein the N carriers are comprised in M carrier groups, and each binary bit of the M binary bits indicates same statuses of the one terminal on all carriers of a respective carrier group; and
- determine the statuses of the one terminal on the N carriers based on the power saving signal, wherein each of the statuses of the one terminal on the N carriers comprises information that the one terminal monitors a physical downlink control channel (PDCCH) or does not monitor the PDCCH.

20. A computer-readable storage medium, comprising instructions, wherein when the instructions are run on a computer, the computer is enabled to:
- generate a power saving signal; and
- send the power saving signal, wherein the power saving signal comprises M binary bits, and the M binary bits directly indicate statuses of one terminal on N carriers, M is a positive integer, N is an integer greater than 1, and M is less than N, wherein a first binary bit directly indicates same statuses of the one terminal on at least two of the N carriers, and the first binary bit is one of the M binary bits, wherein each of the statuses of the one terminal on the N carriers comprises information that the one terminal monitors a physical downlink control channel (PDCCH) or does not monitor the PDCCH, and wherein the N carriers are comprised in M carrier groups, and each binary bit of the M binary bits indicates same statuses of the one terminal on all carriers of a respective carrier group.

* * * * *

UNITED STATES PATENT AND TRADEMARK OFFICE
CERTIFICATE OF CORRECTION

PATENT NO. : 12,363,635 B2
APPLICATION NO. : 17/422614
DATED : July 15, 2025
INVENTOR(S) : Yifan Xue and Jian Wang Page 1 of 1

It is certified that error appears in the above-identified patent and that said Letters Patent is hereby corrected as shown below:

In the Claims

In Column 33, In Line 9 (Approx.), In Claim 1, delete "Mis" and insert -- M is --.

In Column 33, In Line 47, In Claim 6, delete "Mis" and insert -- M is --.

Signed and Sealed this
Twenty-third Day of December, 2025

John A. Squires
*Director of the United States Patent and Trademark Office*